United States Patent
Wong et al.

(10) Patent No.: US 10,277,470 B2
(45) Date of Patent: *Apr. 30, 2019

(54) METHODS AND APPARATUS TO IDENTIFY NETWORK TOPOLOGIES

(71) Applicant: AT&T Intellectual Property I, L.P., Atlanta, GA (US)

(72) Inventors: Kin Wong, Raleigh, NC (US); Wen Shang, South Amboy, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/445,546

(22) Filed: Feb. 28, 2017

(65) Prior Publication Data

US 2017/0171031 A1   Jun. 15, 2017

Related U.S. Application Data

(63) Continuation of application No. 14/098,234, filed on Dec. 5, 2013, now Pat. No. 9,608,874.

(51) Int. Cl.
*G06F 15/173* (2006.01)
*H04L 12/24* (2006.01)

(52) U.S. Cl.
CPC ......... *H04L 41/12* (2013.01); *H04L 41/0803* (2013.01); *H04L 41/5009* (2013.01)

(58) Field of Classification Search
CPC ............................ H04L 41/12; H04L 41/5009
See application file for complete search history.

(56) References Cited

U.S. PATENT DOCUMENTS

| 5,394,522 A | 2/1995 | Sanchez-Frank et al. |
| 5,586,254 A | 12/1996 | Kondo et al. |

(Continued)

FOREIGN PATENT DOCUMENTS

| GB | 2206713 A | 1/1989 |
| WO | 2009026286 A1 | 2/2009 |

OTHER PUBLICATIONS

Hazelhurst, Scott, "Algorithms for Analysing Firewall and Router Access Lists", <http://arxiv.org/pdf/cs.NI/0008006.pdf>, Aug. 9, 2000 (12 pages).

(Continued)

*Primary Examiner* — John B Walsh
(74) *Attorney, Agent, or Firm* — Hanley, Flight & Zimmerman, LLC

(57) ABSTRACT

Methods and apparatus to identify network topologies are disclosed. An example method includes determining a set of network nodes in a set of end-to-end communication paths between a pair of designated nodes based on a configuration of the network and locations of the designated nodes within the network. The set of network nodes excludes a subset of the network nodes that are present in all the end-to-end communication paths. A binary decision table is generated that includes up to $2^N$ entries where N is the number of nodes in the set of network nodes. The respective nodes are represented in respective columns of the binary decision table, and data in the row of the columns indicates distinct combinations of the network nodes. Performance measurement commands are generated for a set of valid combinations of the network nodes that enable monitoring of the network according to the configuration of the network.

20 Claims, 14 Drawing Sheets

(56) References Cited

U.S. PATENT DOCUMENTS

| | | |
|---|---|---|
| 5,821,937 A | 10/1998 | Tonelli et al. |
| 5,941,992 A * | 8/1999 | Croslin ............... H04Q 3/0079 |
| | | 370/225 |
| 6,243,384 B1 * | 6/2001 | Eriksson ................ H04L 45/02 |
| | | 370/389 |
| 6,330,005 B1 | 12/2001 | Tonelli et al. |
| 6,473,794 B1 | 10/2002 | Guheen et al. |
| 6,571,285 B1 | 5/2003 | Groath et al. |
| 6,615,166 B1 | 9/2003 | Guheen et al. |
| 6,625,648 B1 | 9/2003 | Schwaller et al. |
| 6,836,467 B2 | 12/2004 | Stanley |
| 7,055,107 B1 | 5/2006 | Rappaport et al. |
| 7,242,945 B2 | 7/2007 | Reddi |
| 7,286,971 B2 | 10/2007 | Rappaport et al. |
| 7,403,771 B2 | 7/2008 | Allen |
| 7,937,470 B2 | 5/2011 | Curley et al. |
| 7,978,627 B2 | 7/2011 | Taylor et al. |
| 8,020,088 B2 | 9/2011 | Jones |
| 8,185,122 B2 | 5/2012 | Guill, Jr. |
| 8,259,134 B2 | 9/2012 | Mital et al. |
| 2003/0198190 A1 | 10/2003 | Rajan et al. |
| 2008/0026765 A1 | 1/2008 | Charbonneau |
| 2008/0168550 A1 | 7/2008 | Choudhury et al. |
| 2008/0201112 A1 | 8/2008 | Bouchard et al. |
| 2013/0070603 A1 * | 3/2013 | Sahaly ................ H04L 45/121 |
| | | 370/237 |
| 2013/0290520 A1 | 10/2013 | Noo et al. |

OTHER PUBLICATIONS

Sangireddy, Rama and Somani, Arun, "High-Speed IP Routing With Binary Decision Diagrams Based Hardware Address Lookup Engine", IEEE Journal on Selected Areas in Communications, vol. 21, No. 4, May 2003 (pp. 513-521).

United States Patent and Trademark Office, "Non-Final Office Action", issued in connection with U.S. Appl. No. 14/098,234, dated Jan. 13, 2016 (7 pages).

United States Patent and Trademark Office, "Final Office Action", issued in connection with U.S. Appl. No. 14/098,234, dated Jul. 8, 2016 (7 pages).

United States Patent and Trademark Office, Notice of Allowance, issued in connection with U.S. Appl. No. 14/098,234, dated Nov. 16, 2016 (10 pages).

* cited by examiner

| A-AR | A-AG1 | A-AG2 | A-AG3 | Z-AG3 | Z-AG2 | Z-AG1 | Z-AR | Measured Segments (AR-AR e2e) | Comment |
|---|---|---|---|---|---|---|---|---|---|
| 1 | 0 | 0 | 0 | 0 | 0 | 0 | 1 | N/A | invalid |
| 1 | 0 | 0 | 0 | 0 | 0 | 1 | 1 | hair-pin case | valid |
| 1 | 0 | 0 | 0 | 0 | 1 | 0 | 1 | Z-ag2--A-ar, Z-ag2--Z-ar | valid |
| 1 | 0 | 0 | 0 | 0 | 1 | 1 | 1 | Z-ag2--A-ar, Z-ag2--Z-ar | valid |
| 1 | 0 | 0 | 0 | 1 | 0 | 0 | 1 | Z-ag3--A-ar, Z-ag3--Z-ar | valid |
| 1 | 0 | 0 | 0 | 1 | 0 | 1 | 1 | Z-ag3--A-ar, Z-ag3--Z-ar | valid |
| 1 | 0 | 0 | 0 | 1 | 1 | 0 | 1 | Z-ag3--A-ar, Z-ag3--Z-ag2, Z-ag2--Z-ar | valid |
| 1 | 0 | 0 | 0 | 1 | 1 | 1 | 1 | Z-ag3--A-ar, Z-ag3--Z-ag2, Z-ag2--Z-ar | valid |
| 1 | 0 | 0 | 1 | 0 | 0 | 0 | 1 | A-ag3--A-ar, A-ag3--Z-ar | valid |
| 1 | 0 | 0 | 1 | 0 | 0 | 1 | 1 | A-ag3--A-ar, A-ag3--Z-ar | valid |
| 1 | 0 | 0 | 1 | 0 | 1 | 0 | 1 | A-ag3--A-ar, A-ag3--Z-ag2, Z-ag2--Z-ar | valid |
| 1 | 0 | 0 | 1 | 0 | 1 | 1 | 1 | A-ag3--A-ar, A-ag3--Z-ag2, Z-ag2--Z-ar | valid |
| 1 | 0 | 0 | 1 | 1 | 0 | 0 | 1 | A-ag3--A-ar, A-ag3--Z-ag3, Z-ag3--Z-ar | valid |
| 1 | 0 | 0 | 1 | 1 | 0 | 1 | 1 | A-ag3--A-ar, A-ag3--Z-ag3, Z-ag3--Z-ar | valid |
| 1 | 0 | 0 | 1 | 1 | 1 | 0 | 1 | A-ag3--A-ar, A-ag3--Z-ag3, Z-ag3--Z-ag2 | valid |
| 1 | 0 | 0 | 1 | 1 | 1 | 1 | 1 | A-ag3--A-ar, A-ag3--Z-ag2, Z-ag2--Z-ar | valid |
| 1 | 0 | 1 | 0 | 0 | 0 | 0 | 1 | A-ag2--A-ar, A-ag2--Z-ar | valid |
| 1 | 0 | 1 | 0 | 0 | 0 | 1 | 1 | A-ag2--A-ar, A-ag2--Z-ar | valid |
| 1 | 0 | 1 | 0 | 0 | 1 | 0 | 1 | A-ag2--A-ar, A-ag2--Z-ag2, Z-ag2--zar | valid |
| 1 | 0 | 1 | 0 | 0 | 1 | 1 | 1 | A-ag2--A-ar, A-ag2--Z-ag2, Z-ag2--zar | valid |
| 1 | 0 | 1 | 0 | 1 | 0 | 0 | 1 | A-ag2--A-ar, A-ag2--Z-ag3, Z-ag3--Z-ar | valid |
| 1 | 0 | 1 | 0 | 1 | 0 | 1 | 1 | A-ag2--A-ar, A-ag2--Z-ag3, Z-ag3--Z-ar | valid |
| 1 | 0 | 1 | 0 | 1 | 1 | 0 | 1 | A-ag2--A-ar, A-ag2--Z-ag3, Z-ag3--Z-ag2, Z-ag2--Z-ar | valid |
| 1 | 0 | 1 | 0 | 1 | 1 | 1 | 1 | A-ag2--A-ar, A-ag2--Z-ag3, Z-ag3--Z-ag2, Z-ag2--Z-ar | valid |

FIG. 7A

| A-AR | A-AG1 | A-AG2 | A-AG3 | Z-AG3 | Z-AG2 | Z-AG1 | Z-AR | Measured Segments (AR-AR e2e) | Comment |
|---|---|---|---|---|---|---|---|---|---|
| 1 | 0 | 1 | 0 | 1 | 0 | 1 | 1 | A-ag2--A-ar, A-ag2--Z-ag3, Z-ag3--Z-ar | valid |
| 1 | 0 | 1 | 0 | 1 | 1 | 0 | 1 | A-ag2--A-ar, A-ag2--Z-ag3, Z-ag3--Z-ag2, Z-ag2--Z-ar | valid |
| 1 | 0 | 1 | 0 | 1 | 1 | 1 | 1 | A-ag2--A-ar, A-ag2--Z-ag3, Z-ag3--Z-ag2, Z-ag2--Z-ar | valid |
| 1 | 0 | 1 | 1 | 0 | 0 | 0 | 1 | A-ag2--A-ar, A-ag2--A-ag3, A-ag3--Z-ar | valid |
| 1 | 0 | 1 | 1 | 0 | 0 | 1 | 1 | A-ag2--A-ar, A-ag2--A-ag3, A-ag3--Z-ar | valid |
| 1 | 0 | 1 | 1 | 0 | 1 | 0 | 1 | A-ag2--A-ar, A-ag2--A-ag3, A-ag3--Z-ag2, Z-ag2--Z-ar | valid |
| 1 | 0 | 1 | 1 | 0 | 1 | 1 | 1 | A-ag2--A-ar, A-ag2--A-ag3, A-ag3--Z-ag2, Z-ag2--Z-ar | valid |
| 1 | 0 | 1 | 1 | 1 | 0 | 0 | 1 | A-ag2--A-ar, A-ag2--Z-ag3, Z-ag3--Z-ar | valid |
| 1 | 0 | 1 | 1 | 1 | 0 | 1 | 1 | A-ag2--A-ar, A-ag2--A-ag3, A-ag3--Z-ag3, Z-ag3--Z-ar | valid |
| 1 | 0 | 1 | 1 | 1 | 1 | 0 | 1 | A-ag2--A-ar, A-ag2--A-ag3, A-ag3--Z-ag3, Z-ag3--Z-ag2, Z-ag2--Z-ar | valid |
| 1 | 0 | 1 | 1 | 1 | 1 | 1 | 1 | A-ag2--A-ar, A-ag2--A-ag3, A-ag3--Z-ag3, Z-ag3--Z-ag2, Z-ag2--Z-ar | valid |
| 1 | 1 | 0 | 0 | 0 | 0 | 0 | 1 | hair-pin case | valid |
| 1 | 1 | 0 | 0 | 0 | 0 | 1 | 1 | N/A | invalid |
| 1 | 1 | 0 | 0 | 0 | 1 | 0 | 1 | Z-ag2--A-ar, Z-ag2--Z-ar | valid |
| 1 | 1 | 0 | 0 | 0 | 1 | 1 | 1 | Z-ag2--A-ar, Z-ag2--Z-ar | valid |
| 1 | 1 | 0 | 0 | 1 | 0 | 0 | 1 | Z-ag3--A-ar, Z-ag3--Z-ar | valid |
| 1 | 1 | 0 | 0 | 1 | 0 | 1 | 1 | Z-ag3--A-ar, Z-ag3--Z-ar | valid |

FIG. 7B

| A-AR | A-AG1 | A-AG2 | A-AG3 | Z-AG3 | Z-AG2 | Z-AG1 | Z-AR | Measured Segments (AR-AR e2e) | Comment |
|---|---|---|---|---|---|---|---|---|---|
| 1 | 1 | 0 | 0 | 1 | 1 | 0 | 1 | Z-ag3--A-ar, Z-ag3--Z-ag2, Z-ag2--Z-ar | valid |
| 1 | 1 | 0 | 0 | 1 | 1 | 1 | 1 | Z-ag3--A-ar, Z-ag3--Z-ag2, Z-ag2--Z-ar | valid |
| 1 | 1 | 0 | 1 | 0 | 0 | 0 | 1 | A-ag3--A-ar, A-ag3--Z-ar | valid |
| 1 | 1 | 0 | 1 | 0 | 0 | 1 | 1 | A-ag3--A-ar, A-ag3--Z-ar | valid |
| 1 | 1 | 0 | 1 | 0 | 1 | 0 | 1 | A-ag3--A-ar, A-ag3--Z-ag2, Z-ag2--Z-ar | valid |
| 1 | 1 | 0 | 1 | 0 | 1 | 1 | 1 | A-ag3--A-ar, A-ag3--Z-ag2, Z-ag2--Z-ar | valid |
| 1 | 1 | 0 | 1 | 1 | 0 | 0 | 1 | A-ag3--A-ar, A-ag3--Z-ag3, Z-ag3--Z-ar | valid |
| 1 | 1 | 0 | 1 | 1 | 0 | 1 | 1 | A-ag3--A-ar, A-ag3--Z-ag3, Z-ag3--Z-ar | valid |
| 1 | 1 | 0 | 1 | 1 | 1 | 0 | 1 | A-ag3--A-ar, A-ag3--Z-ag3, Z-ag3--Z-ag2, Z-ag2--Z-ar | valid |
| 1 | 1 | 0 | 1 | 1 | 1 | 1 | 1 | A-ag3--A-ar, A-ag3--Z-ag3, Z-ag3--Z-ag2, Z-ag2--Z-ar | valid |
| 1 | 1 | 1 | 0 | 0 | 0 | 0 | 1 | A-ag2--A-ar, A-ag2--Z-ar | valid |
| 1 | 1 | 1 | 0 | 0 | 0 | 1 | 1 | A-ag2--A-ar, A-ag2--Z-ar | valid |
| 1 | 1 | 1 | 0 | 0 | 1 | 0 | 1 | A-ag2--A-ar, A-ag2--Z-ag2, Z-ag2--zar | valid |
| 1 | 1 | 1 | 0 | 0 | 1 | 1 | 1 | A-ag2--A-ar, A-ag2--Z-ag2, Z-ag2--Z-ar | valid |
| 1 | 1 | 1 | 0 | 1 | 0 | 0 | 1 | A-ag2--A-ar, A-ag2--Z-ag3 | valid |
| 1 | 1 | 1 | 0 | 1 | 0 | 1 | 1 | A-ag2--A-ar , A-ag2--Z-ag3, Z-ag3--Z-ar | valid |
| 1 | 1 | 1 | 0 | 1 | 1 | 0 | 1 | A-ag2--A-ar, A-ag2--Z-ag3, Z-ag3--Z-ag2, Z-ag2--Z-ar | valid |
| 1 | 1 | 1 | 0 | 1 | 1 | 1 | 1 | A-ag2--A-ar, A-ag2--Z-ag3, Z-ag3--Z-ag2, Z-ag2--Z-ar | valid |

FIG. 7C

| A-AR | A-AG1 | A-AG2 | A-AG3 | Z-AG3 | Z-AG2 | Z-AG1 | Z-AR | Measured Segments (AR-AR e2e) | Comment |
|---|---|---|---|---|---|---|---|---|---|
| 1 | 1 | 1 | 1 | 0 | 0 | 0 | 1 | A-ag2--A-ar, A-ag2--A-ag3, A-ag3--Z-ar | valid |
| 1 | 1 | 1 | 1 | 0 | 0 | 1 | 1 | A-ag3--Z-ar, A-ag3--A-ag2, A-ag2--A-ar | valid |
| 1 | 1 | 1 | 1 | 0 | 1 | 0 | 1 | A-ag2--A-ar, A-ag2--A-ag3, A-ag3--Z-ag2, Z-ag2--Z-ar | valid |
| 1 | 1 | 1 | 1 | 0 | 1 | 1 | 1 | A-ag2--A-ar, A-ag2--A-ag3, A-ag3--Z-ag2, Z-ag2--Z-ar | valid |
| 1 | 1 | 1 | 1 | 1 | 0 | 0 | 1 | A-ag2--A-ar, A-ag2--Z-ag3, Z-ag3--Z-ar | valid |
| 1 | 1 | 1 | 1 | 1 | 0 | 1 | 1 | Z-ag3--Z-ar, Z-ag3--A-ag3, A-ag3--A-ag2, A-ag2--A-ar | valid |
| 1 | 1 | 1 | 1 | 1 | 1 | 0 | 1 | A-ag2--A-ar, A-ag2--Z-ag2, Z-ag2--Z-ar | valid |
| 1 | 1 | 1 | 1 | 1 | 1 | 1 | 1 | A-ag2--A-ar, A-ag2--Z-ag2, Z-ag2--Z-ar | valid |

FIG. 7D

METHODS AND APPARATUS TO IDENTIFY NETWORK TOPOLOGIES

RELATED APPLICATION

This patent arises from a continuation of U.S. patent application Ser. No. 14/098,234, entitled, "Method and Apparatus to Identify Network Topologies," filed Dec. 5, 2013 (now U.S. Pat. No. 9,608,874). Priority to U.S. patent application Ser. No. 14/098,234 is claimed. U.S. patent application Ser. No. 14/098,234 is hereby incorporated herein by reference in its entirety.

FIELD OF THE DISCLOSURE

This disclosure relates generally to communication networks, and, more particularly, to methods and apparatus to identify network topologies.

BACKGROUND

As the number of access networks (e.g., portions of a communication network used by customers to access the core network for delivery and/or receipt of data) to support business traffic has increased, the demands on bandwidth have likewise increased. An access network can be the source of bottlenecks in the communications network. To meet growing bandwidth demands, the provider of the communication network may use larger, more capable routers closer to the customers (e.g., farther downstream) in the access network, and use larger, more capable core routers to handle higher volumes of communication traffic to increase throughput.

BRIEF DESCRIPTION OF THE DRAWINGS

FIGS. 7A-7D illustrate an example Binary Decision Table for the end-to-end communications path of FIG. 6.

The figures are not to scale. Wherever possible, the same reference numbers will be used throughout the drawing(s) and accompanying written description to refer to the same or like parts.

DETAILED DESCRIPTION

Figure 1:
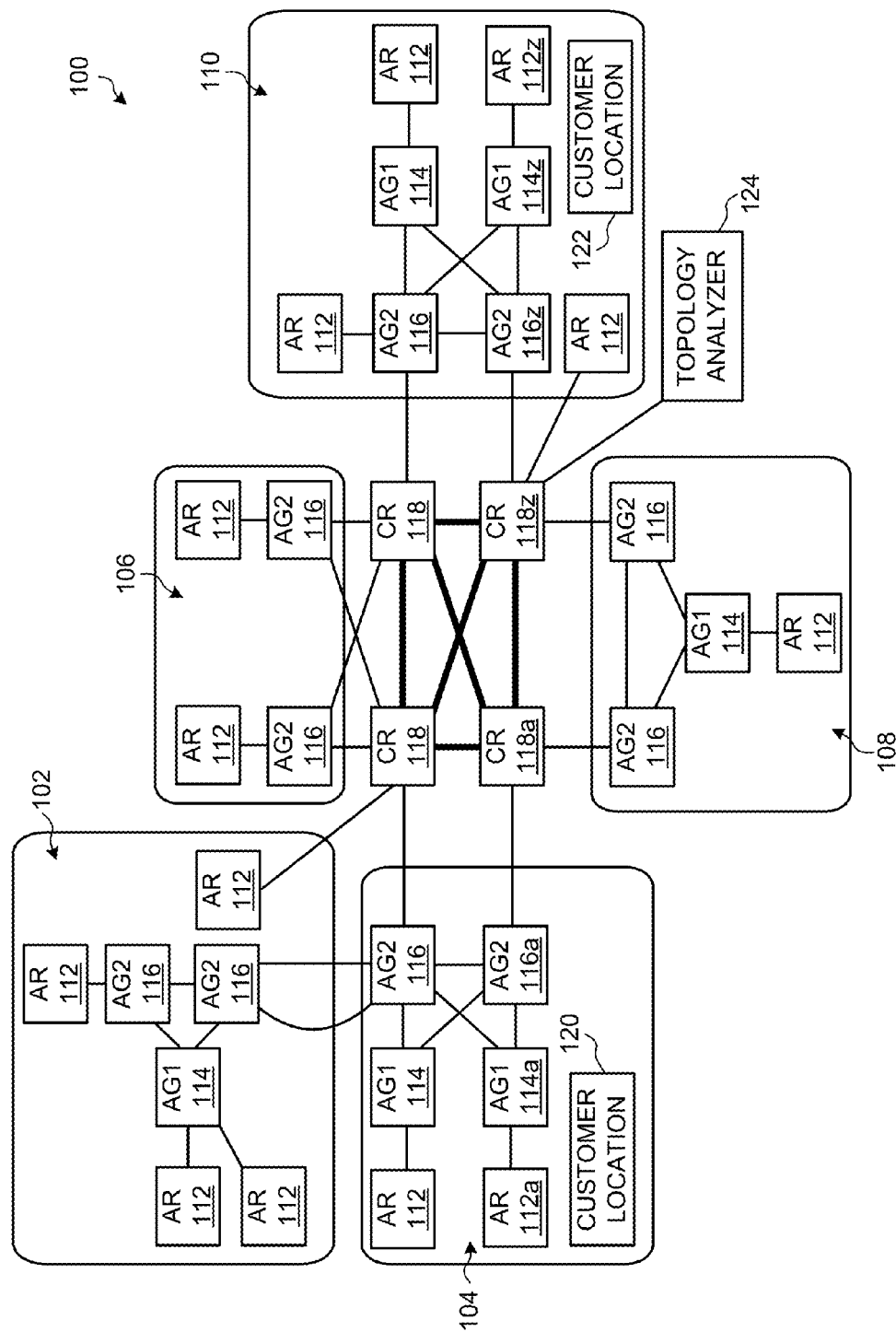
FIG. 1 is a diagram of an example communication network including multiple local access and transport areas (LATAs).

As a result of using larger routers closer to the customers, access network configurations have become more flexible and end-to-end path topologies may include different combinations of aggregation routers and core routers. Example methods and apparatus disclosed herein generate and analyze Binary Decision Tables to identify changing communication network topologies in a deterministic manner. The analysis performed using Binary Decision Tables may be used to determine, for example, an appropriate topology through a network for an end-to-end communications connection (e.g., a new connection to be established using an existing network). As used herein, a connection may refer to a physical link between two nodes (e.g., a fiber or conductive link) and/or to a tunnel (e.g., a virtual path) representative of a link between two nodes. Example methods and apparatus disclosed herein may additionally or alternatively be used for evaluating network performance and/or service level agreement (SLA) compliance in response to network changes. As used herein, the term "rehoming" refers to changing an aspect of a network node, such as changing a role of physical routing hardware in the network. Changes in network topologies may occur due to, for example, rehoming of network nodes (e.g., routers, aggregation nodes, core nodes, etc.) for other purposes and/or locations and/or due to intentional or unintentional downtime of network nodes (e.g., scheduled maintenance, node failure, etc.).

Example methods and apparatus disclosed herein map out an end-to-end path topology using a current network configuration, between two selected end routers, for possible combinations (e.g., all combinations) of customer access routers, aggregation routers, and/or core routers. In some examples, performance measurement servers attached to the customer access routers, aggregation routers, and/or core routers send out probes to other ones of the customer access nodes, aggregation routers, and/or core routers. In some examples, the performance measurement servers send probes to aggregation routers. Based on the responses of the probed devices (e.g., measurements), the performance measurement servers measure the performance metrics (e.g., latency, jitter, packet loss percentage, etc.) for the segments within an end-to-end path. Analysis using Binary Decision Tables ensures that the correct segmented measurements for the end-to-end performance metrics calculation between selected pair of nodes are identified.

Example methods and apparatus disclosed herein identify deployed routers in an Internet protocol (IP) network using unique codes. In some examples, the unique codes include information elements for a location of the router and a node name (e.g., a router type) for the router. When a proposed pair of access routers is provisioned for a customer, example methods and apparatus disclosed herein identify an end-to-end path topology from a routing table. The end-to-end path topology includes, in some examples, an ordered set of physical routers from a first endpoint (referred to herein as the A-end) to a second endpoint (referred to herein as the Z-end), where each router is uniquely identified by its unique code.

Using these measured segments, example methods and apparatus disclosed herein can obtain the corresponding actual segmented measurements from another measurement feed. The end-to-end performance metrics (e.g., latency, jitter and packet delivery rate) can then be calculated.

Example methods and apparatus disclosed herein may be used to perform system testing. For example, a Binary Decision Table for a network connection can be used as a starting point for preparing test cases to achieve full test coverage because the Binary Decision Table contains all valid path topologies. By testing each of the valid path topologies in the Binary Decision Table, all possible network connections are fully tested. A path topology may be determined to be valid or invalid based on any desired network monitoring or design criteria, such as whether the network can be effectively monitored under a particular path topology.

Example generic types of routers described herein include access routers (e.g., network termination equipment, Ethernet multifunctional terminals, etc.), different levels of aggregation routers (e.g., aggregation router 1, aggregation router 2, etc., where a higher level indicates a higher level of performance or throughput), and core routers. However, example methods and apparatus disclosed herein may be used with other generic types and/or specific models of router.

Example methods and apparatus disclosed herein may be used to analyze special network cases in which one or more of the performance measurement servers attached to the network nodes are not available (e.g., due to re-homing). Example methods and apparatus disclosed herein may additionally or alternatively be used to determine segmented measurement(s) to be excluded from end-to-end performance metrics calculations when a node is taken out of service (e.g., during in a maintenance period), thereby increasing the accuracy and reliability of reported performance metrics.

Example methods and apparatus disclosed herein generate a Binary Decision Table by determining a set of network nodes between a pair of designated (e.g., endpoint) nodes in a network. The example methods and apparatus determine the set of network nodes based on a configuration of the network and locations of the designated nodes. The example methods and apparatus determine valid sub-combinations of the network nodes by determining whether combinations (e.g., each combination) of available ones of the set of network nodes provides a connection between the pair of designated nodes according to the configuration of the network. For example, methods and apparatus disclosed herein may assign nodes (e.g., a customer access router, an aggregation router, a core router, etc.) to a column of the Binary Decision Table and populate the rows with different combinations of the nodes being present or available (e.g., denoted in the row and column using a "1") or absent or unavailable (denoted in the row and column using a "0") of a node. As used herein, the terms "present" and "available" as used with regard to network nodes refer to the network node being operational in the corresponding topology. As used herein, the terms "unavailable" and "absent" refer to the network node not being operational for at least the purposes of the corresponding topology. Unavailable and/or absent nodes may include nodes that have been taken offline for maintenance, nodes that have failed, and/or nodes that are bypassed or omitted from the communication path.

Depending on the number of nodes in an end-to-end path, there may be a fixed number of Binary Decision Table rows. In some examples Binary Decision Tables disclosed herein capture all possible path topologies. For example, an initial Binary Decision Table (e.g., prior to excluding combinations or rows as invalid) includes $2^N$ rows, where N is the number of network nodes (or columns) in the end-to-end path. In some examples, however, some of the network nodes (columns) may be considered to be always present. For example, if there are 8 network nodes in the end-to-end path topology, and 2 customer access routers and 2 associated core routers are considered to always be present, these nodes may be ignored when calculating the number of rows (e.g., combinations of the network nodes being available and/or unavailable) in the table and, thus, the resulting Binary Decision Table includes $2^{(8-4)}=16$ rows. However, if only the two customer end nodes are considered to be always available, the resulting Binary Decision Table includes $2^{(8-2)}=64$ rows. Thus, for a complex network, the number of combinations of nodes can be very high, and using known methods can result in a failure to adequately test all possible network topologies or to unnecessarily test some network topologies. For each row, one can determine the correct segments to be used for end-to-end performance metrics calculation between say, two customer access nodes, or two aggregation nodes associated with the customer nodes.

Example methods and apparatus disclosed herein generate performance measurement commands for the valid sub-combinations (e.g., topologies) of the network nodes in the Binary Decision Table and/or calculate the performance characteristics of the valid sub-combinations of the network nodes. In some examples, the performance characteristics of the valid sub-combinations are compared to each other and/or to threshold performance requirements to aid in establishing end-to-end connections, building out the communications network, and/or maintaining network performance in response to changes in the network configuration.

Some example methods and apparatus disclosed herein implement Binary Decision Tables using spreadsheet software, such as Microsoft® Excel, Apple iWork Numbers, or Lotus® 123, among others. For example, Excel's Data Filtering feature may be used to view the Binary Decision Table data based on selected criteria. An example of such measuring based on selected criteria may include viewing all the associated segmented measurements for a topological path that are affected when a selected aggregation router in the path is taken out of service. Another example criterion may include selecting a segment measurement to view all aggregation routers and peer routers that would be affected if the segment were taken out of service. Moreover, generation of Binary Decision Tables may be implemented using other methods, such as a macro-based implementation, an application, or a service.

FIG. 1 is a diagram of an example communication network 100 including multiple local access and transport areas (LATAs) 102, 104, 106, 108, 110. The LATAs 102-110 are distinct geographical regions and, thus, the LATAs 102-110 are physically separated from one another. The example communication network 100 of FIG. 1 provides communications between customers of the network 100, who connect to the network via access routers (ARs) 112 located within the LATAs 102-110. The ARs 112 of FIG. 1 may be connected to an aggregation router at any of multiple levels of aggregation, such as a first-level aggregation router 114 (AG1), a second-level aggregation router 116 (AG2), and so on. The aggregation routers 114, 116 of FIG. 1 aggregate communications from multiple lower-bandwidth connections to a higher-bandwidth connection to more efficiently utilize the higher bandwidth connections. The AG1s 114 of the example of FIG. 1 operate with lower-bandwidth connections than the AG2s 116. Additionally or alternatively, the ARs 112 of FIG. 1 may be connected directly to core routers (CR) 118, which communicatively couple the different LATAs 102-110. The example core routers 118 represent a full or partial mesh network to transport data between the LATAs 102-110.

During construction, expansion, and/or operation of the network 100, additional customers and/or connections may be added. For example, a customer may sign a SLA for a connection between a first customer location 120 in the LATA 104 and another customer location 122 in the LATA 110. The SLA specifies a particular performance required by the connection between the customer locations. An operator of the network 100 of FIG. 1 has some flexibility in connecting the customer locations 120, 122 to the network 100 within the respective LATAs 104, 110. For example, an AR 112, through which the customer location 120 is connected to the network 100, may be connected to an AG1 114, to an AG2 116, and/or directly to a core router 118.

To identify the routers 112, 114, 116, and/or 118 to be used to connect the customer locations 120, 122, the example network 100 includes a topology analyzer 124. The example topology analyzer 124 determines a set of network nodes (e.g., a subset of the routers 112-118, including the AR 112*a*, the AG1 114*a*, the AG2 116*a*, the CR 118*a*, the CR 118*z*, the AG2 116*z*, the AG1 114*z*, and the AR 112*z*) between a pair of designated nodes in the network 100 (e.g., the customer locations 120, 122, and/or the ARs 112 to which the customer locations 120, 122 or connected) based on a configuration of the network 100 (e.g., the connectivity configuration of the routers 112, 114, 116, 118) and the locations (e.g., the LATAs 102, 110) of the designated nodes 120, 122. The example topology analyzer 124 determines valid sub-combinations of the network nodes (e.g., routers 112-118) by determining whether each combination of available ones of the set of network nodes (e.g., routers 112-118) provides a connection between the pair of designated nodes 120, 122 according to the configuration of the network 100 and/or whether the connection meets the terms of an applicable SLA. For example, the topology analyzer 124 may determine whether a topology is valid by consulting routing tables for the network 100 and/or issuing commands to testing devices to test connections of the network 100. In the example of FIG. 1, the topology analyzer 124 generates performance measurement commands for the valid sub-combinations of the network nodes (e.g., routers 112-118). The performance measurement commands instruct the network 100 (e.g., performance measurement servers associated with the network nodes 112-118) to perform measurements of the performance (e.g., measurements of the performance metrics specified in the SLA) for the different combinations of the network nodes (e.g., routers 112-118).

Figure 2:
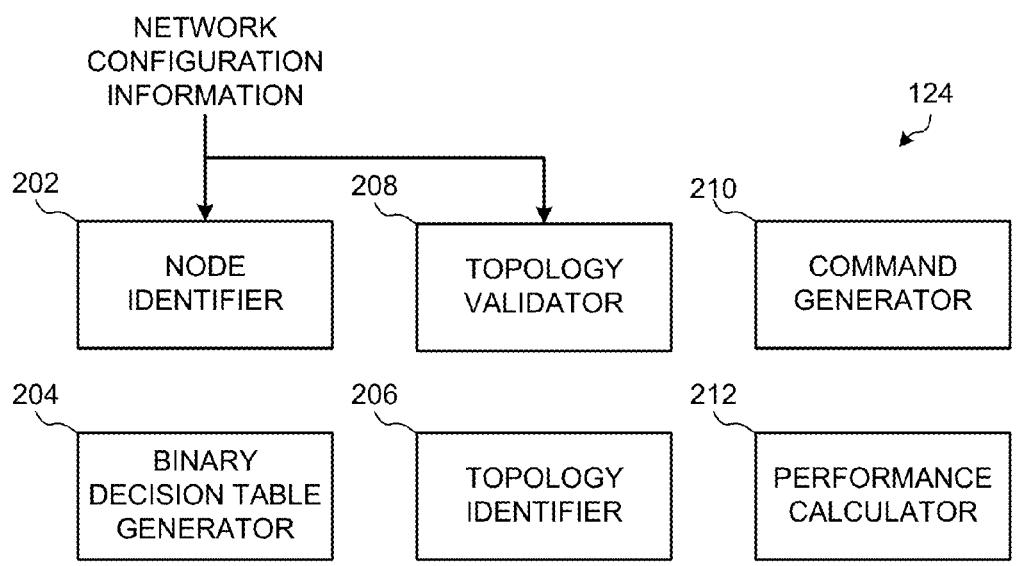
FIG. 2 is a block diagram of an example topology analyzer to identify network topologies in the communication network of FIG. 1.

FIG. 2 is a more detailed block diagram of an implementation of the example topology analyzer 124 of FIG. 1. The example topology analyzer 124 of FIG. 2 includes a node identifier 202, a Binary Decision Table generator 204, a topology identifier 206, a topology validator 208, a command generator 210, and a performance calculator 212.

The example node identifier 202 of FIG. 2 receives configuration information for the network 100 and the locations of the example endpoints (e.g., the customer locations 120, 122). Based on the configuration and the endpoints 120, 122, the example node identifier 202 identifies the network nodes that connect the endpoints 120, 122.

Figure 3:
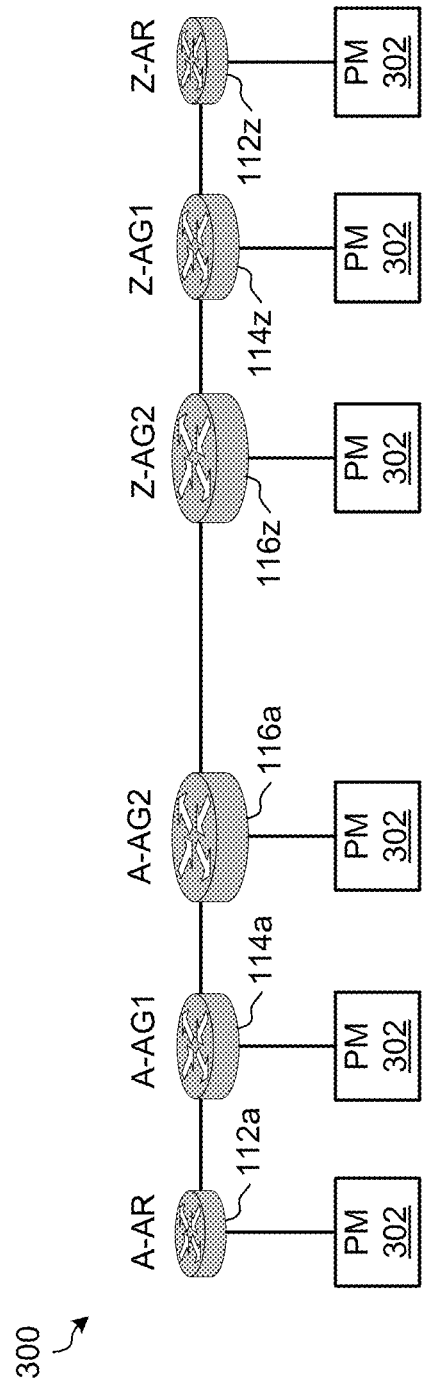
FIG. 3 is a diagram of an example end-to-end communications path to provide a communications connection between endpoints.

To identify the network nodes, the example node identifier 202 may consult routing tables included in the network configuration information and/or query a routing table server responsible for managing the routing in the network 100. In the example of FIG. 1, the node identifier 202 identifies the AR 112*a*, the AG1 114*a*, the AG2 116*a*, the AG2 116*z*, the AG1 114*z*, and the AR 112*z* as the network nodes. FIG. 3 is a diagram of an example end-to-end communications path 300 to provide a communications connection between endpoints. The example communications path 300 of FIG. 3 represents the example nodes 112*a*-116*a*, 112*z*-116*z* identified by the example node identifier 202.

Figure 4:
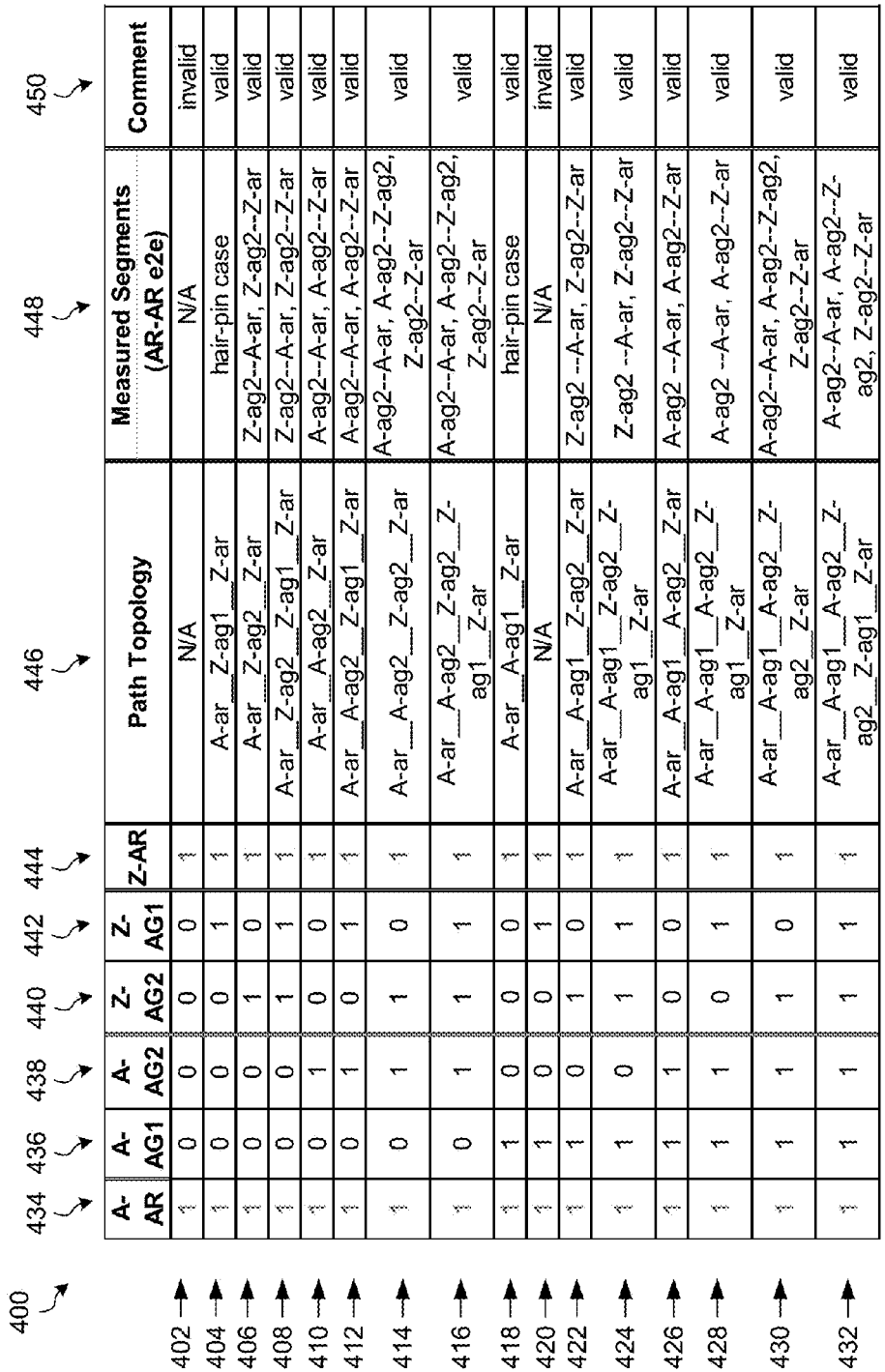
FIG. 4 is an example Binary Decision Table for the end-to-end communications path of FIG. 3.

Returning to FIG. 2, the example Binary Decision Table generator 204 of FIG. 2 generates a Binary Decision Table based on network nodes 112*a*-116*a*, 112*z*-116*z* identified by the node identifier 202. For example, the Binary Decision Table generator 204 may generate a Binary Decision Table having $2^N$ rows, in which each node is represented by a column and each row represents a distinct combination of the nodes being available or unavailable. FIG. 4 is an example Binary Decision Table 400 generated by the Binary Decision Table generator 204 for the end-to-end communications path 300 of FIG. 3. The example Binary Decision Table 400 of FIG. 4 includes 16 (e.g., $2^4$) rows 402-432 for different combinations of the AG1 112*a* (A-AG1), the AG2 114*a* (A-AG2), the AG2 114*z* (Z-AG2), and the AG1 112*z* (Z-AG1).

In the example Binary Decision Table 400 of FIG. 4, each of the nodes 112*a*-116*a*, 112*z*-116*z* is represented by a column 434-444. Where the column 434-444 is populated with a '1,' the node 112*a*-116*a*, 112*z*-116*z* corresponding to that column 434-444 is considered to be available or present in the topology represented by that row 402-432. Conversely, where the column 434-444 is populated with a '0,' the node 112*a*-116*a*, 112*z*-116*z* corresponding to that column 434-444 is considered to be unavailable or absent in the topology represented for that row 402-432. For example, row 412 of the example Binary Decision Table 400 specifies a topology in which the A-AR, the A-AG2, the Z-AG1, and the Z-AR are available or present, and the A-AG1 and the Z-AG2 are unavailable or absent. In contrast, row 420 of the example Binary Decision Table 400 of FIG. 4 specifies a topology in which the A-AR, the A-AG1, the Z-AG1, and the Z-AR are available or present, and the A-AG2 and the Z-AG2 are unavailable or absent.

While the entries of the example Binary Decision Table 400 of FIG. 4 are identified using A- and Z-, the example columns representing the network nodes 112*a*-116*a*, 112*z*-116*z* may be replaced with unique identifiers of the respective network nodes 112*a*-116*a*, 112*z*-116*z* (e.g., serial numbers, network node identifiers, IP addresses, node names, and/or any other unique identifier used by the network operator).

In some examples, the Binary Decision Table generator 204 generates the Binary Decision Table under the assumption that certain ones of the identified nodes 112*a*-116*a*, 112*z*-116*z* are always available. For example, such an assumption may be made for nodes that are necessary to connectivity (e.g., access routers) and/or for nodes that are sufficiently robust and/or redundant to as to be considered effectively fail-proof (e.g., core routers). In the example of FIGS. 3 and 4, the access routers 112*a*, 112*z* are shown in the Binary Decision Table 400 (e.g., as always present) and the core routers 118*a*, 118*z* are omitted from the Binary Decision Table 400 (e.g., as redundant).

Returning to FIG. 2, the example topology identifier 206 of the illustrated example determines a topology classification for the example rows 402-432 of the Binary Decision Table 400 of FIG. 4. In the illustrated example, the example topology identifier 206 identifies the topology of the example rows 402-432 by determining a type of node (e.g., router) of the available nodes in the row 402-432. The topology identifier 206 populates the Binary Decision Table 400 with the identified topology (e.g., path topology column 446). FIGS. 5A-5F illustrate example combinations 502-512 (e.g., topologies) of available network nodes 112a-116a, 112z-116z in the end-to-end communications path 300 of FIG. 3. As in the communications path 300 of FIG. 3, the core routers 118a-118z are considered to be consistently available and, thus, are omitted from the topologies 502-512.

Figure 5:
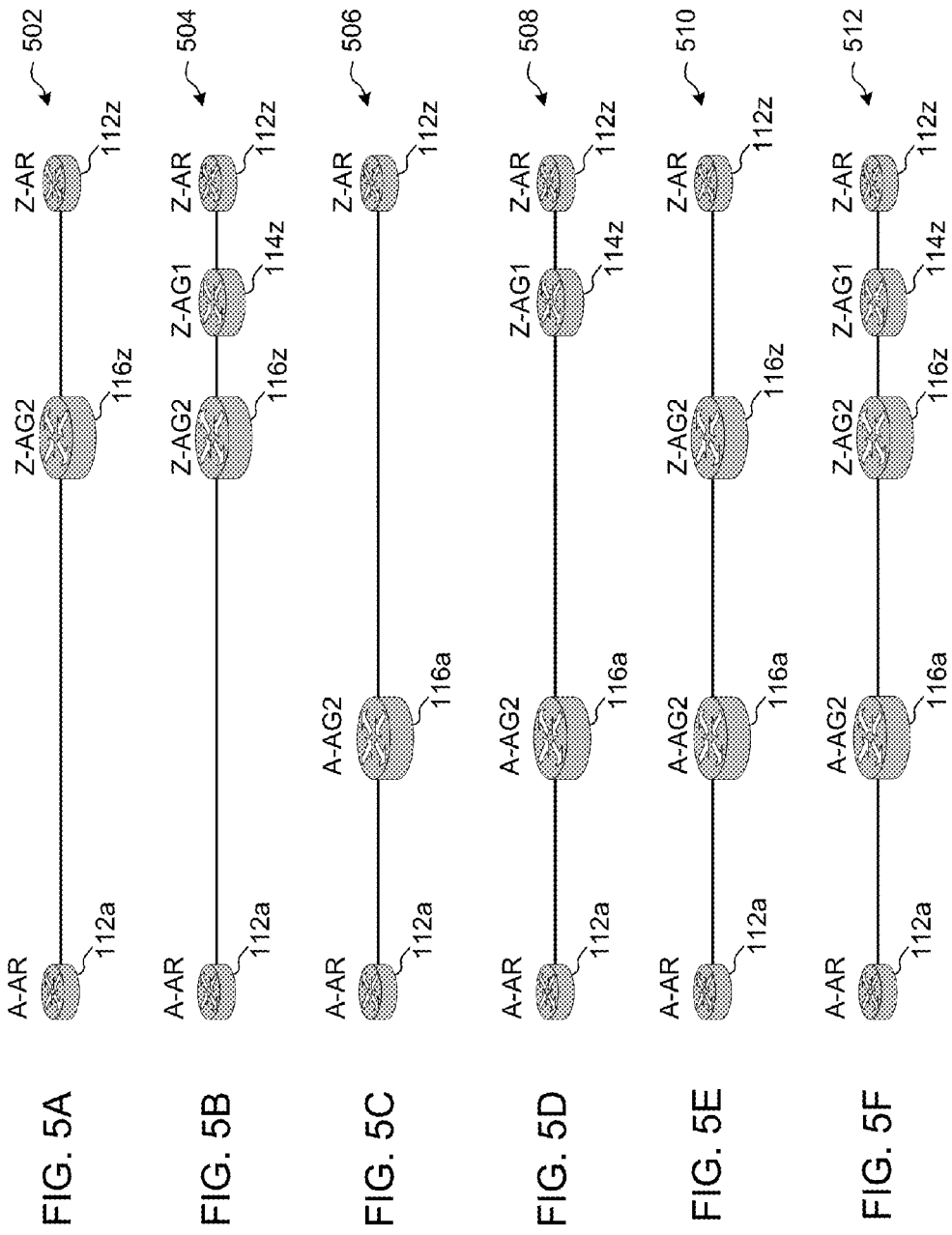
FIGS. 5A-5F illustrate example combinations of available network nodes in the end-to-end communications path of FIG. 3.

The example topology 502 of FIG. 5A corresponds to row 406 of the Binary Decision Table 400. The example topology 504 of FIG. 5B corresponds to row 408 of the Binary Decision Table 400. The example topology 506 of FIG. 5C corresponds to row 410 of the Binary Decision Table 400. The example topology 508 of FIG. 5D corresponds to row 412 of the Binary Decision Table 400. The performance of the example topologies 502-508 is measured using two segments (e.g., A-AR-Z-AG2 and Z-AG2-Z-AR). Thus, the performances of the example topologies 502-508 may be efficiently measured using a same measurement. The example topology 510 of FIG. 5E corresponds to row 414 of the Binary Decision Table 400. The example topology 512 of FIG. 5F corresponds to row 416 of the Binary Decision Table 400. The performance of each of the example topologies 510, 512 is measured using three segments (e.g., A-AG2-A-AR, A-AG2-Z-AG2, and Z-AG2-Z-AR).

In some cases, the topology identifier 206 determines each row 402-432 to have a different topology classification. However, in some applications the topology identifier 206 determines that certain ones of the topologies are effectively equivalent and classifies those rows with the same topology. For example, the rows 406 and 408 have equivalent topologies and the rows 410 and 412 have equivalent topologies based on a measurement equivalence (e.g., for generating measurement commands). Another example of an equivalent topology is based on symmetry; the symmetry may include determining that row 404 (e.g., A-AR, Z-AG1, Z-AR) and row 418 (e.g., A-AR, A-AG1, Z-AR) have equivalent topologies (e.g., A-AR, AG1, Z-AR) and/or determining that row 406 (e.g., A-AR, Z-AG2, Z-AR) and row 410 (e.g., A-AR, A-AG2, Z-AR) have equivalent topologies (e.g., A-AR, AG2, Z-AR). Such equivalent classifications may occur if, for example, the network operator has flexibility in connecting one or both of the endpoints 120, 122 to the network 100.

The example topology validator 208 of FIG. 2 determines whether the topologies identified by the topology identifier 206 are valid topologies according to the configuration of the network 100. For example, the topology validator 208 may determine whether a topology (e.g., a combination of the network nodes 112a-116a, 112z-116z being available and/or unavailable) provides a connection between the endpoints 120, 122 by consulting a routing table. If communications cannot be routed between the endpoints 120, 122 using the available nodes in the topology, the topology is considered to be invalid and the corresponding row may be excluded from the Binary Decision Table 400. The example Binary Decision Table 400 of FIG. 4 indicates that the path topologies corresponding to rows 402 and 420 are invalid topologies for the configuration of the network 100 because the topologies do not meet network design criteria (e.g., the topologies cannot be effectively monitored under the network configuration).

The example command generator 210 of FIG. 2 generates commands or instructions to measure performance of the identified topologies in the Binary Decision Table and/or to calculate an overall performance (e.g., latency, jitter, packet loss percentage, etc.) of the topologies.

As illustrated in FIG. 3, the network nodes 112a-116a, 112z-116z of the example network 100 are associated with respective performance measurement (PM) servers 302. The PM servers 302 of FIG. 3 make performance measurements representative of the links between the network nodes 112a-116a, 112z-116z. The command generator 210 generates and transmits the commands to measure the individual segments making up a path topology. The commands are received and implemented by the PM servers 302 to perform the measurements. The example PM servers 302 also conduct periodic (e.g., every 15 minutes, hourly, daily, etc.) and/or aperiodic probing to obtain performance measurements for each relevant segment of the network.

The example performance calculator 212 of FIG. 2 calculates the performance of a network topology based on performance measurements made by the PM servers 302 of FIG. 3. The example performance calculator 212 further compares the performance of a topology to the performances of other topologies, to required performance thresholds specified by an SLA, and/or to other thresholds occurring during network buildout and/or management.

While an example manner of implementing the topology analyzer 124 of FIG. 1 is illustrated in FIG. 2, one or more of the elements, processes and/or devices illustrated in FIG. 1 may be combined, divided, re-arranged, omitted, eliminated and/or implemented in any other way. Further, the example node identifier 202, the example Binary Decision Table generator 204, the example topology identifier 206, the example topology validator 208, the example command generator 210, the example performance calculator 212 and/or, more generally, the example topology analyzer 124 of FIG. 1 may be implemented by hardware, software, firmware and/or any combination of hardware, software and/or firmware. Thus, for example, any of the example node identifier 202, the example Binary Decision Table generator 204, the example topology identifier 206, the example topology validator 208, the example command generator 210, the example performance calculator 212 and/or, more generally, the example topology analyzer 124 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, node identifier 202, the example Binary Decision Table generator 204, the example topology identifier 206, the example topology validator 208, the example command generator 210, and/or the example performance calculator 212 is/are hereby expressly defined to include a tangible computer readable storage device or storage disk such as a memory, a digital versatile disk (DVD), a compact disk (CD), a Blu-ray disk, etc. storing the software and/or firmware. Further still, the example topology analyzer 124 of FIG. 1 may include one or more elements, processes and/or devices in addition to, or instead of, those illustrated in FIG. 2, and/or may include more than one of any or all of the illustrated elements, processes and devices.

Figure 6:
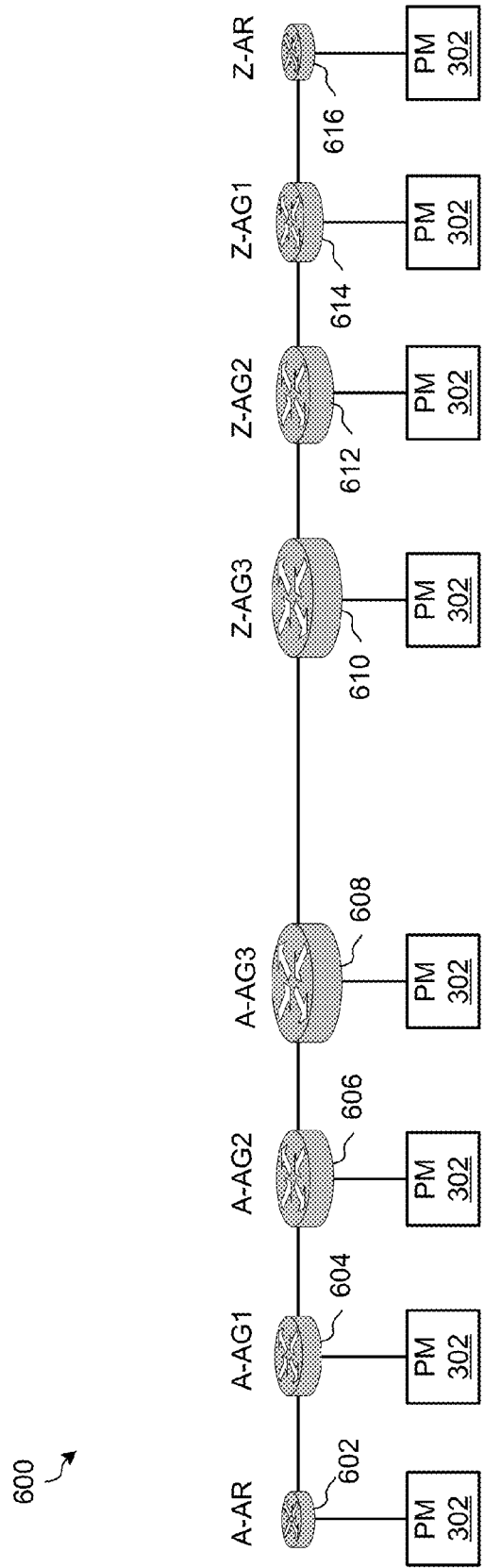
FIG. 6 is a diagram of another example end-to-end communications path to provide a communications connection between endpoints.

FIG. 6 is a diagram of another example end-to-end communications path 600 to provide a communications connection between the example endpoints 120, 122 of FIG. 1. FIGS. 7A-7D illustrate an example Binary Decision Table 700 for the end-to-end communications path of FIG. 6. The example end-to-end communications path 600 includes 8 network nodes: an A-AR 602, an A-AG1 604, an A-AG2 606, an A-AG3 608, a Z-AG3 610, a Z-AG2 612, a Z-AG1 614, and a Z-AR 616. Accordingly, the example Binary Decision Table 700 of FIGS. 7A-7D include $2^6$ (e.g., $2^{(8-2)}$ =64), rows. In the example communications path 600 of FIG. 6, the A-AR 602, the A-AG1 604, the A-AG2 606, and the A-AG3 608 are in a first LATA (e.g., the LATA 104) and the Z-AG3 610, the Z-AG2 612, the Z-AG1 614, and the Z-AR 616 are in a second LATA (e.g., the LATA 110).

While the example communications paths 300 and 600 of FIGS. 3 and 6 are symmetrical (e.g., equal numbers of nodes in the communications path in each LATA), communications paths may be asymmetrical (e.g., different numbers of nodes in the communications path in different LATAs).

In some examples, one or more nodes in the communication path 600 do not have associated PM servers 302 for making performance measurements between the node and other ones of the nodes. In such examples, the Binary Decision Table generator 204, the topology identifier 206, and/or the command generator 210 generate topologies and/or measurements to measure links including the nodes that do not have the PM servers 302 (e.g., for combinations or entries in the Binary Decision Table 700 that include such nodes).

FIGS. 6 and 7A-7D illustrate how a communication path through a complex network may result in a very large Binary Decision Table 700 representative of a very large number of topologies to be considered during network design. By setting forth and evaluating the potential network topologies connecting network nodes, the example Binary Decision Table 700 of FIG. 7 reduces the risk of error in the network design of FIG. 6 by ensuring that each of the potential network topologies in the example communication path 600 (e.g., each combination of nodes 602-616 that may be used to connect endpoints) is considered with respect to the network configuration and/or performance tested. Additionally, the Binary Decision Tables inform performance measurements to ensure that end-to-end connections meet SLA requirements (e.g., for each potential network connection and/or in the event of certain network node failures) and/or to alert network operators to potential SLA requirement failures (e.g., to generate alerts in the event that one or more configurations or network node failures would cause an SLA violation).

Figure 8:
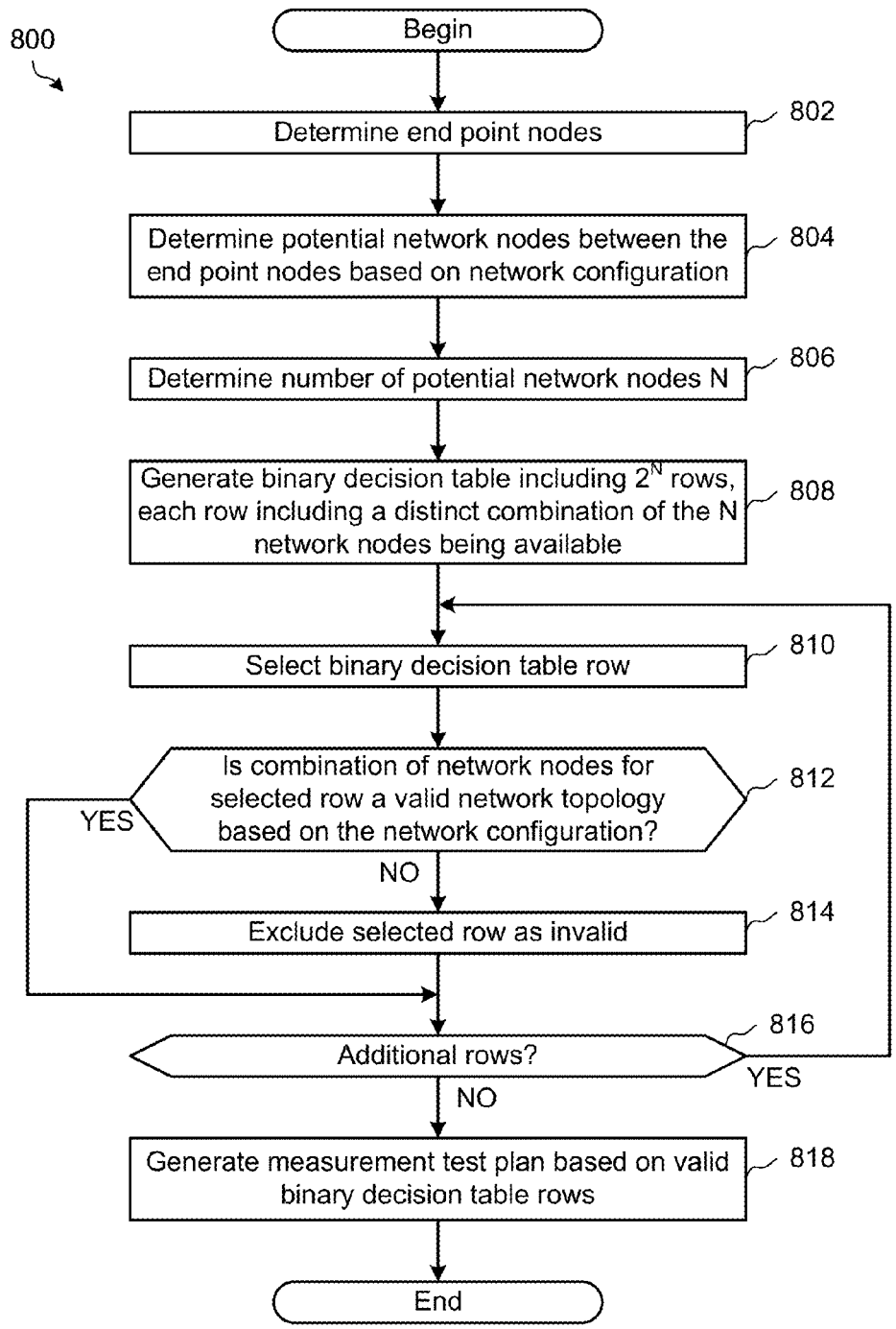
FIG. 8 is a flowchart representative of example machine readable instructions which may be executed by the example topology analyzer of FIGS. 1 and/or 2 to generate a binary decision table to identify network topologies.
Figure 9:
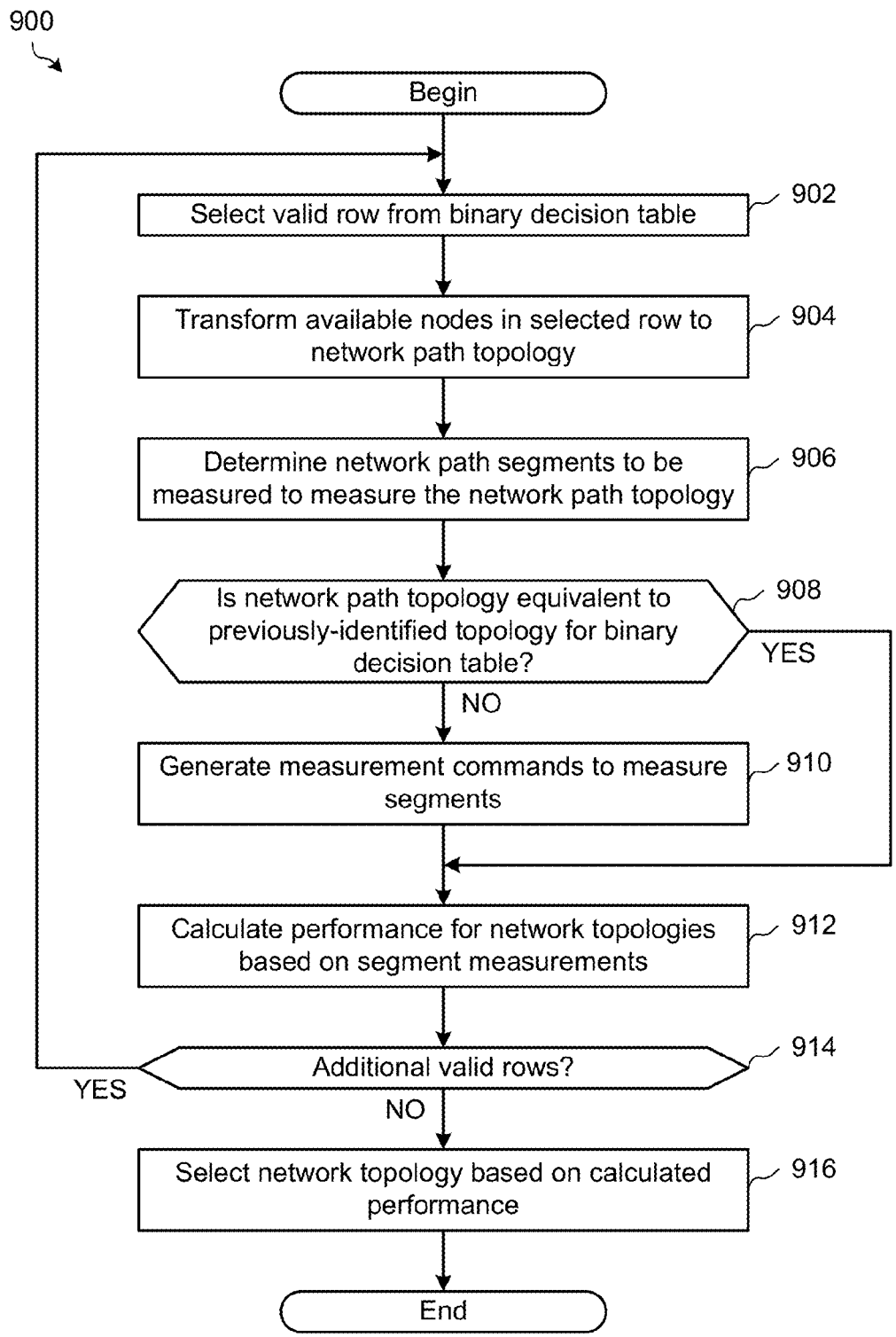
FIG. 9 is a flowchart representative of example machine readable instructions which may be executed by the example topology analyzer of FIGS. 1 and/or 2 to determine a network path topology.
Figure 10:
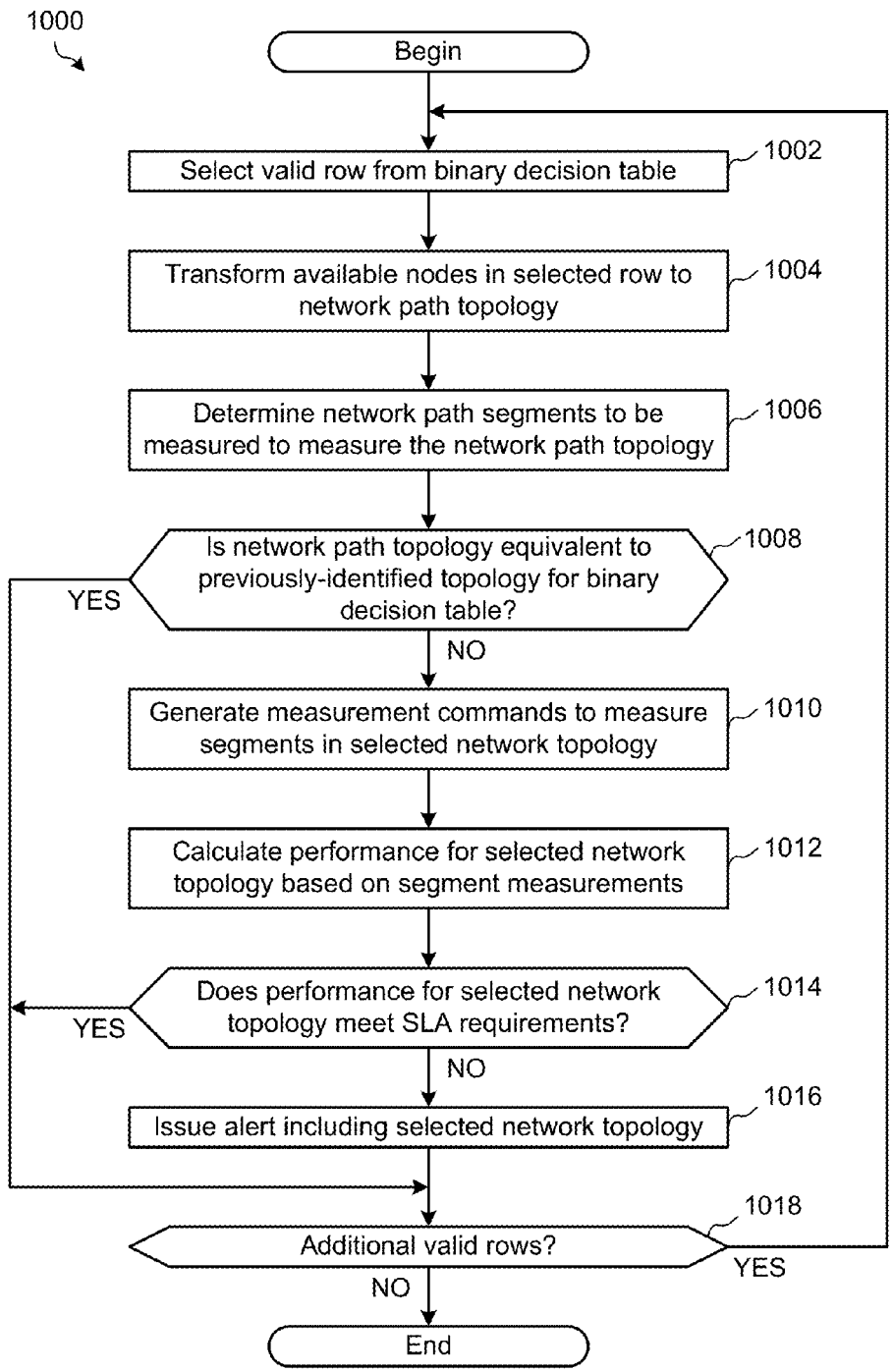
FIG. 10 is a flowchart representative of example machine readable instructions which may be executed by the example topology analyzer of FIGS. 1 and/or 2 to test the performance of a network connection.

Flowcharts representative of example machine readable instructions for implementing the topology analyzer 124 of FIGS. 1 and/or 2 are shown in FIGS. 8, 9, and 10. In these examples, the machine readable instructions comprise programs for execution by a processor such as the processor 1112 shown in the example processor platform 1100 discussed below in connection with FIG. 11. The programs may be embodied in software stored on a tangible computer readable storage medium such as a CD-ROM, a floppy disk, a hard drive, a digital versatile disk (DVD), a Blu-ray disk, or a memory associated with the processor 1112, but the entire programs and/or parts thereof could alternatively be executed by a device other than the processor 1112 and/or embodied in firmware or dedicated hardware. Further, although the example programs are described with reference to the flowcharts illustrated in FIGS. 8, 9, and/or 10, many other methods of implementing the example topology analyzer 124 may alternatively be used. For example, the order of execution of the blocks may be changed, and/or some of the blocks described may be changed, eliminated, or combined.

As mentioned above, the example processes of FIGS. 8, 9, and/or 10 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the example processes of FIGS. 8, 9, and/or 10 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

FIG. 8 is a flowchart representative of example machine readable instructions 800 which may be performed by the example topology analyzer 124 of FIGS. 1 and/or 2 to generate a Binary Decision Table to identify network topologies.

The example topology analyzer 124 (e.g., via the node identifier 202 of FIG. 2) determines the end point nodes (e.g., the customer locations 120, 122) (block 802). The example node identifier 202 determines the potential network nodes between the end point nodes 120, 122 in the network 100 based on the configuration of the network 100 (block 804). For example, the node identifier 202 may query the routing tables for the network 100 to identify the nodes 112a-118a, 112z-118z between the customer locations 120, 122.

The Binary Decision Table generator 204 determines a number N of the potential network nodes 112a-118a, 112z-118z (block 806). The determined number N may include all of the potential network nodes 112a-118a, 112z-118z and/or a subset of the nodes (e.g., the nodes 112a-116a, 112z-116z). The Binary Decision Table generator 204 generates a Binary Decision Table (e.g., the Binary Decision Table 400 of FIG. 4) including $2^N$ rows, where each row includes a distinct combination of the N network nodes (e.g., the nodes 112a-116a, 112z-116z) (block 808).

The example topology validator 208 of FIG. 2 selects a row (e.g., row 402) from the Binary Decision Table 400 (block 810). The example topology validator 208 of FIG. 2 determines, based on the network configuration, whether the combination of network nodes 112*a*-116*a*, 112*z*-116*z* for the selected row is a valid network topology (block 812). A network topology may be consider valid based to any desired network configuration criteria. For example, the topology validator 208 determines the network topology to be valid when the entire network topology can be probed or monitored by the performance monitors 302. Conversely, the topology validator 208 determines the network topology to be invalid when all or at least a threshold portion of the network topology cannot be probed or monitored (e.g., because insufficient PM servers 302 are available to perform the monitoring under the network topology and network configuration).

If the combination for the selected row is not a valid combination (block 812), the example topology validator 208 excludes the selected row as invalid (block 814). After excluding the row (block 814), or if the combination of network nodes for the selected row provides a connection (block 812), the example topology validator 208 determines whether there are additional rows (e.g., rows not yet validated or invalidated) (block 816). If there are additional rows (block 816), control returns to block 810 to select another row.

When there are no additional rows (block 816), the example command generator 210 of FIG. 2 generates a measurement test plan based on the valid Binary Decision Table rows (block 818). Example measurement test plans may include measuring performance of connections between the endpoints 120, 122 for each of the topologies to determine an optimal topology for connecting the endpoints 120, 122. Another example measurement test plan includes measuring the performance of connections between the endpoints to determine whether any potential SLA violations could occur in the event of a failure of one or more of the network nodes 112*a*-116*a*, 112*z*-116*z*. In some examples, generating the measurement test plan includes generating commands to PM servers (e.g., the PM servers 302 of FIG. 3) to implement the measurements. The example instructions 800 then end.

FIG. 9 is a flowchart representative of example machine readable instructions 900 which may be performed by the example topology analyzer 124 of FIGS. 1 and/or 2 to determine a network path topology.

The example topology identifier 206 of FIG. 2 selects a valid row from the Binary Decision Table (e.g., the Binary Decision Table 400 of FIG. 4) (block 902). The topology identifier 206 may determine that a row is valid based on a comment or validity field 450 and/or based on the presence of the row in the Binary Decision Table (e.g., based on the assumption that invalid rows have been excluded from the Binary Decision Table 400).

The topology identifier 206 transforms the network nodes that are available in the selected row into a network path topology (block 904). For example, the topology identifier 206 may determine the nodes that have a '1' in the corresponding row and convert those nodes to a path topology (e.g., the path topology field 446) using the identifiers of the determined nodes. Because multiple such network path topologies matching the set of nodes in the row may exist, the example topology identifier 206 may select between possible path topologies using additional criteria such as performance requirements, geographic location, and/or any other applicable criteria.

The topology identifier 206 of FIG. 2 determines the network path segments to be measured to measure the network path topology (block 906). For example, the topology identifier 206 may identify the segments to be measured via the PM servers 302 to measure the performance of the path topology.

The example topology identifier 206 determines whether the network path topology (determined in block 904) for the selected row is equivalent to any previously-identified topologies in the Binary Decision Table 400 (block 908). For example, the topology identifier 206 may determine whether the segments to be measured for the path topology of the selected row are identical to the segments to be measured for a path topology for another row of the Binary Decision Table 400.

If the network path topology is not equivalent to a previously-identified topology (block 908), the example command generator 210 of FIG. 2 generates measurement commands to measure the network path segments (block 910). For example, the command generator 210 may generate and transmit commands to the appropriate PM servers 302 to measure the segments for the selected row.

After generating the measurement commands (block 910), or if the network path topology is equivalent to a previously-identified topology in the Binary Decision Table 400 (block 908), the example performance calculator 212 calculates the performance for the path topology of the selected row based on the segment measurements (block 912). For example, the performance calculator 212 may calculate a latency of the path topology 300 by summing the latencies of the segments of the path topology, subtracting portions of latencies of segments that partially overlap, and/or applying compensation factors to account for aspects of segment performance that may not be reflected in the measurements. The performance calculation may be based on the measurement commands generated in block 910 and/or from measurement commands that were previously generated for a path topology equivalent to the topology of the selected row. In some topologies such as a "hair pin" case (e.g., a topology in which both the A-AR and the Z-AR are coupled to the same aggregation router such as the A-AG1 or Z-AG1) that cannot be directly measured via the PMs 302, the example performance calculator 212 collects performance measurements of completely or partially overlapping links and subtracts the performance measurements to obtain the performance of the link.

The example topology identifier 206 determines whether there are additional valid rows in the Binary Decision Table 400 (block 914). If there are additional valid rows (block 914), control returns to block 902 to select another valid row. When there are no more valid rows (block 914), the example command generator 210 of FIG. 2 selects a network topology based on the calculated performances of the rows and/or topologies in the Binary Decision Table 400. For example, the command generator 210 may select a network topology to be used for implementing an end-to-end connection in the network 100. In some examples, the command generator may implement the selected topology by generating and transmitting topology instructions to set up tunnels implementing the topology. In other examples, the topology may require physical changes to the network nodes 112-118. The example instructions 900 then end.

FIG. 10 is a flowchart representative of example machine readable instructions 1000 which may be executed by the example topology analyzer 124 of FIGS. 1 and/or 2 to test the performance of a network connection.

The example topology identifier 206 of FIG. 2 performs example blocks 1002-1008 of FIG. 10 in an identical manner as corresponding blocks 902-908 of FIG. 9. Blocks 1002-1008 are not discussed further herein. If, in block 1008, the example topology identifier 206 determines that the network path topology is not equivalent to a previously-identified topology for the Binary Decision Table, the command generator 210 generates measurement commands to measure the segments in the network topology of the selected row (selected in block 1002) (block 1010). For example, the command generator 210 may generate and transmit commands to the appropriate PM servers 302 to measure the segments for the selected row.

The example performance calculator 212 calculates the performance for the path topology of the selected row based on the segment measurements (block 1012). For example, the performance calculator 212 may calculate a latency of the path topology by summing the latencies of the segments of the path topology, subtracting portions of latencies of segments that partially overlap, and/or applying compensation factors to account for aspects of segment performance that may not be reflected in the measurements. Compensation factors may be applied to compensate performance measurements for particular routing situations, such as when the performance of a segment is measured where the segment traverses a node that cannot be directly measured (e.g., a node that does not have an associated PM server 302).

The example performance calculator 212 determines whether the performance for the network topology of the selected row meets SLA requirements defined for the end-to-end connection (block 1014). For example, the performance calculator 212 may determine whether the calculated performance meets requirements for latency, jitter, packet loss percentage, and/or other network measurements. If the performance does not meet (or potentially does not meet) SLA requirements (block 1014), the example performance calculator 212 issues an alert or other message specifying the network topology of the selected row (block 1016). The alert may include, for example, generating a work order or other notification to the network operator to upgrade or otherwise address the network conditions that could potentially lead to an SLA violation.

After issuing the alert (block 1016), or if the network path topology is equivalent to a previously identified topology (block 1008), the example topology identifier 206 determines whether there are additional valid rows in the Binary Decision Table (block 1018). If there are additional valid rows (block 1018), control returns to block 1002 to select another row. When there are no more valid rows (block 1018), the example instructions 1000 of FIG. 10 end.

Figure 11:
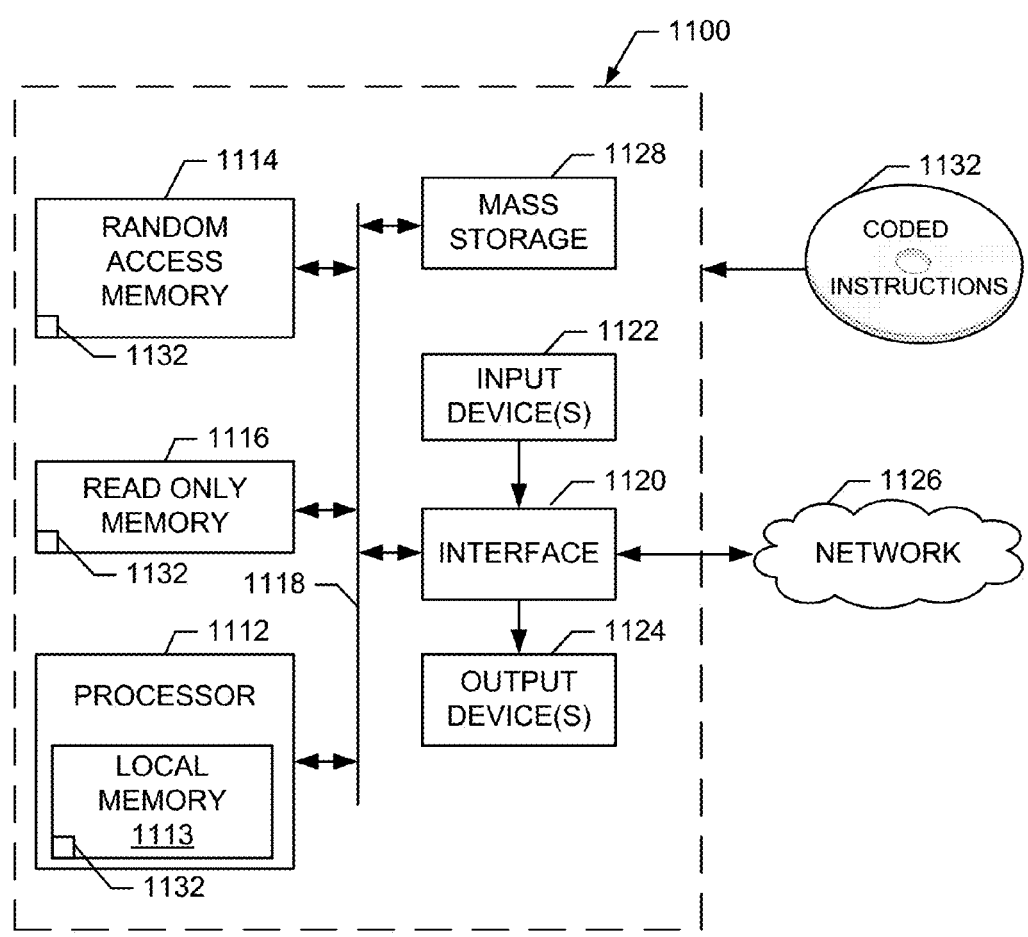
FIG. 11 is a block diagram of an example processor platform capable of executing the instructions of FIGS. 8, 9 and/or 10 to implement the topology analyzer of FIGS. 1 and/or 2.

FIG. 11 is a block diagram of an example processor platform 1100 capable of executing the instructions of FIGS. 8, 9, and/or 10 to implement the topology analyzer 124 of FIGS. 1 and/or 2. The processor platform 1100 can be, for example, a server, a personal computer, a routing device, a network node, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors or controllers from any desired family or manufacturer.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), and/or a PCI express interface.

In the illustrated example, one or more input devices 1122 are connected to the interface circuit 1120. The input device (s) 1122 permit(s) a user to enter data and commands into the processor 1112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1120 of the illustrated example, thus, typically includes a graphics driver card, a graphics driver chip or a graphics driver processor.

The interface circuit 1120 of the illustrated example also includes a communication device such as a transmitter, a receiver, a transceiver, a modem and/or network interface card to facilitate exchange of data with external machines (e.g., computing devices of any kind) via a network 1126 (e.g., an Ethernet connection, a digital subscriber line (DSL), a telephone line, coaxial cable, a cellular telephone system, etc.).

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, RAID systems, and digital versatile disk (DVD) drives.

The coded instructions 1132 of FIGS. 8, 9, and/or 10 may be stored in the mass storage device 1128, in the volatile memory 1114, in the non-volatile memory 1116, and/or on a removable tangible computer readable storage medium such as a CD or DVD.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method, comprising:
    determining, by executing an instruction with a processor, a first set of network nodes in a set of end-to-end communication paths between a pair of designated nodes based on a configuration of a network and locations of the pair of designated nodes within the network;
    determining a second set of network nodes that are present in all the end-to end communication paths included in the set of end-to-end communication paths between the pair of designated nodes;
    forming a third set of network nodes including the first set of network nodes and excluding the second set of network nodes;

generating, by executing an instruction with the processor, a binary decision table including up to $2^N$ rows of entries, wherein N is the number of nodes in the third set of network nodes, respective nodes of the first set of network nodes being represented in respective columns of the binary decision table, and data in respective ones of the rows of the binary decision table representing respective ones of a set of initial combinations of the first set of network nodes, the set of initial combinations of the first network nodes including the second set of network nodes in combination with respective distinct combinations of the third set of network nodes;

generating, by executing an instruction with the processor, performance measurement commands for a set of valid combinations from the set of initial combinations of the first set of network nodes, the valid combinations corresponding to respective rows of the binary decision tree that enable monitoring of the network according to the configuration of the network; and determining which of the valid combinations is to be used for routing messages between a first designated node of the pair and a second designated node of the pair based on measured performance characteristics.

2. The method defined in claim 1, further including removing a subset of the initial combinations of the first set of network nodes from the binary decision table, the subset of the initial combinations including combinations of the first set of network nodes that do not provide monitoring of the network based on the configuration of the network.

3. The method defined in claim 2, wherein the $2^N$ rows of entries represent distinct ones of the initial combinations of the first set of network nodes having a first portion of the network nodes available and a second portion of the network nodes unavailable, wherein the determining of the valid combinations includes:

determining whether the configuration of the network enables monitoring of the network for a first one of the $2^N$ entries corresponding to a first one of the initial combinations of the first set of network nodes; and when the configuration of the network enables monitoring of the network using the available nodes and not using the unavailable nodes in the first one of the $2^N$ entries, determining the first one of the initial combinations of the first set of network nodes to be one of the valid combinations; and wherein the removing of the subset of the initial combinations of the first set of network nodes includes removing the first one of the initial combinations of the first set of network nodes when the configuration of the network does not enable monitoring of the network using the available nodes and not using the unavailable nodes in the first one of the $2^N$ entries.

4. The method defined in claim 1, further including measuring performance characteristics for the valid combinations.

5. The method defined in claim 4, further including determining segments of the network that are representative of respective ones of the valid combinations of the first set of network nodes, wherein the measuring of the performance characteristics includes measuring the segments and calculating the performance characteristics based on the measurements.

6. The method defined in claim 1, further including determining that a first one of the valid combinations of the first set of network nodes has a topology that is equivalent to at least a second one of the valid combinations of the first set of network nodes.

7. The method defined in claim 1, further including selecting a network topology corresponding to one of the valid combinations of the first set of network nodes to implement a connection between the pair of designated nodes based on measurements performed in response to the performance measurement commands.

8. An apparatus, comprising:

a processor; and memory including computer readable instructions which, when executed, cause the processor to perform operations including:

determining a first set of network nodes in a set of end-to-end communication paths between a pair of designated nodes in a network based on a configuration of the network and locations of the designated nodes;

determining a second set of network nodes that are present in all the end-to end communication paths included in the set of end-to-end communication paths between the pair of designated nodes;

forming a third set of network nodes that includes the first set of network nodes and excludes the second set of network nodes;

determining valid combinations of the network nodes by determining whether initial combinations of available ones of the first set of network nodes enables monitoring of the network according to the configuration of the network, the valid combinations corresponding to the second set of network nodes in combination with respective distinct combinations of the third set of network nodes;

generating performance measurement commands for the valid combinations of the network nodes; and determining which of the valid combinations is to be used for routing messages between a first designated node of the pair and a second designated node of the pair based on measured performance characteristics.

9. The apparatus defined in claim 8, wherein the operations further include removing a subset of the initial combinations of the available ones of the first set of network nodes from a binary decision table, the subset of the initial combinations including combinations of the first set of network nodes that do not provide monitoring of the network based on the configuration of the network.

10. The apparatus defined in claim 9, wherein the operation to determine the valid combinations includes:

generating the binary decision table to include $2^N$ rows of entries, wherein N is the number of nodes in the third set of network nodes, the $2^N$ rows of entries representing distinct ones of the initial combinations having a first portion of the network nodes available and a second portion of the network nodes unavailable;

determining, for a first one of the $2^N$ entries corresponding to a first one of the initial combinations of the first set of network nodes, whether the configuration of the network enables monitoring of the network; and when the configuration of the network enables monitoring of the network using the available nodes and not using the unavailable nodes in the first one of the $2^N$ entries, determining the first one of the initial combinations of the first set of network nodes to be a one of the valid combinations; and wherein the removing of the subset of the initial combinations of the first set of network nodes includes removing the first one of the initial combinations of the first set of network nodes when the configuration of the network does not enable monitoring of the network using the available nodes and not using the unavailable nodes in the first one of the $2^N$ entries.

11. The apparatus defined in claim 8, the operations further including measuring performance characteristics for the valid combinations.

12. The apparatus defined in claim 11, wherein the operations further include determining segments of the network that are representative of respective ones of the valid combinations of the first set of network nodes, and the measuring of the performance characteristics includes measuring the segments and calculating the performance characteristics based on the measurements.

13. The apparatus defined in claim 8, wherein the operations further include determining that a first one of the valid combinations of the first set of network nodes has a topology that is equivalent to at least a second one of the valid combinations of the first set of network nodes.

14. The apparatus defined in claim 8, wherein the operations further include selecting a network topology corresponding to one of the valid combinations of the network nodes to implement a connection between the pair of designated nodes based on measurements performed in response to the performance measurement commands.

15. A tangible computer readable storage medium comprising computer readable instructions that, when executed, cause a processor to perform operations including:
 determining a first set of network nodes in a set of end-to-end communication paths between a pair of designated nodes in a network based on a configuration of the network and locations of the designated nodes;
 determining a second set of network nodes that are present in all the end-to end communication paths included in the set of end-to-end communication paths between the pair of designated nodes;
 forming a third set of network nodes that includes the first set of network nodes and excludes the second set of network nodes;
 determining valid combinations of the network nodes by determining whether initial combinations of available ones of the first set of network nodes enables monitoring of the network according to the configuration of the network, the valid combinations corresponding to the second set of network nodes in combination with respective distinct combinations of the third set of network nodes;
 generating performance measurement commands for the valid combinations of the network nodes; and
 determining which of the valid combinations is to be used for routing messages between a first designated node of the pair and a second designated node of the pair based on measured performance characteristics.

16. The storage medium defined in claim 15, wherein the operations further include removing a subset of the initial combinations of the available ones of the first set of network nodes from a binary decision table, the subset of the initial combinations including combinations of the first set of network nodes that do not provide monitoring of the network based on the configuration of the network.

17. The storage medium defined in claim 15, wherein the operations further include determining the valid combinations by:
 generating the binary decision table to include $2^N$ rows of entries, wherein N is the number of nodes in the third set of network nodes, the $2^N$ rows of entries representing distinct ones of the initial combinations having a first portion of the network nodes available and a second portion of the network nodes unavailable;
 determining, for a first one of the $2^N$ entries corresponding to a first one of the initial combinations of the first set of network nodes, whether the configuration of the network enables monitoring of the network; and
 when the configuration of the network enables monitoring of the network using the available nodes and not using the unavailable nodes in the first one of the $2^N$ entries, determining the first one of the initial combinations of the first set of network nodes to be one of the valid combinations; and
 wherein the removing of the subset of the initial combinations of the first set of network nodes includes removing the first one of the initial combinations of the first set of network nodes when the configuration of the network does not enable monitoring of the network using the available nodes and not using the unavailable nodes in the first one of the $2^N$ entries.

18. The storage medium defined in claim 15, wherein the operations further include measuring performance characteristics for the valid combinations.

19. The storage medium defined in claim 18, wherein the operations further include determining segments of the network that are representative of respective ones of the valid combinations of the first set of network nodes, wherein the measuring of the performance characteristics includes measuring the segments and calculating the performance characteristics based on the measurements.

20. The storage medium defined in claim 15, wherein the operations further include determining that a first one of the valid combinations of the first set of network nodes has a topology that is equivalent to at least a second one of the valid combinations of the first set of network nodes.

* * * * *